(12) United States Patent
Dedrick

(10) Patent No.: US 11,693,568 B2
(45) Date of Patent: *Jul. 4, 2023

(54) WORKLOAD-ADAPTIVE OVERPROVISIONING IN SOLID STATE STORAGE DRIVE ARRAYS

(71) Applicant: Kioxia Corporation, Tokyo (JP)

(72) Inventor: Joel H. Dedrick, Irvine, CA (US)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,579

(22) Filed: Sep. 20, 2021

(65) Prior Publication Data
US 2022/0004327 A1   Jan. 6, 2022

Related U.S. Application Data

(63) Continuation of application No. 15/915,716, filed on Mar. 8, 2018, now Pat. No. 11,132,133.

(51) Int. Cl.
*G06F 3/06* (2006.01)

(52) U.S. Cl.
CPC .......... *G06F 3/0631* (2013.01); *G06F 3/0616* (2013.01); *G06F 3/0653* (2013.01); *G06F 3/0688* (2013.01)

(58) Field of Classification Search
None
See application file for complete search history.

(56) References Cited

U.S. PATENT DOCUMENTS

| | | |
|---|---|---|
| 8,122,185 B2 | 2/2012 | Merry, Jr. et al. |
| 8,479,080 B1 | 7/2013 | Shalvi et al. |
| 9,372,628 B1 | 6/2016 | Barajas Gonzalez et al. |
| 9,569,120 B2 | 2/2017 | Ryan et al. |
| 9,619,149 B1 | 4/2017 | Cummins et al. |
| 9,619,381 B2 | 4/2017 | Camp et al. |

(Continued)

FOREIGN PATENT DOCUMENTS

| | | |
|---|---|---|
| CN | 102890621 B | 6/2016 |
| CN | 105824576 A | 8/2016 |

(Continued)

OTHER PUBLICATIONS

Feng Chen et al., "Software Support Inside and Outside Solid-State Devices for High Performance and High Efficiency," Proceedings of the IEEE, vol. 105, No. 9, Sep. 9, 2017, pp. 1650-1665.

*Primary Examiner* — Charles Rones
*Assistant Examiner* — Ryan Dare
(74) *Attorney, Agent, or Firm* — Allen & Overy LLP

(57) ABSTRACT

A method for managing overprovisioning in a solid state storage drive (SSD) array comprising (i) receiving usage data from each of a plurality of SSDs, (ii) determining a predicted service life value for each of the plurality of SSDs based on at least the usage data, (iii) comparing each of the predicted service life values with a predetermined service life value for each respective SSD, (iv) remapping at least one namespace in at least one of the plurality of SSDs among the plurality of SSDs, or reducing an available logical storage capacity for at least one of the plurality of SSDs. Here the remapping or reducing is based on a result of the comparing that the predicted service life value for the at least one of the plurality of SSDs is not greater than the predetermined service life value for that SSD.

19 Claims, 6 Drawing Sheets

(56) References Cited

U.S. PATENT DOCUMENTS

| | | |
|---|---|---|
| 9,696,935 B2 | 7/2017 | Hashimoto et al. |
| 10,474,371 B1 | 11/2019 | Ravindranath et al. |
| 2009/0282301 A1 | 11/2009 | Flynn et al. |
| 2010/0106933 A1 | 4/2010 | Kamila et al. |
| 2011/0099320 A1 | 4/2011 | Lucas et al. |
| 2011/0173378 A1 | 7/2011 | Filor et al. |
| 2011/0173484 A1 | 7/2011 | Schuette et al. |
| 2014/0181369 A1 | 6/2014 | Horn |
| 2014/0281126 A1 | 9/2014 | Bleyer et al. |
| 2015/0039935 A1 | 2/2015 | Gao et al. |
| 2015/0134926 A1 | 5/2015 | Yang et al. |
| 2015/0261451 A1 | 9/2015 | Bickelman et al. |
| 2016/0070474 A1 | 3/2016 | Yu et al. |
| 2016/0162205 A1 | 6/2016 | Grimsrud |
| 2017/0003891 A1 | 1/2017 | Arai et al. |
| 2017/0024137 A1 | 1/2017 | Kanno |
| 2017/0046070 A1 | 2/2017 | Sunaga |
| 2017/0131947 A1 | 5/2017 | Hoang et al. |
| 2017/0131948 A1 | 5/2017 | Hoang et al. |
| 2017/0160976 A1 | 6/2017 | Thangaraj et al. |
| 2017/0364298 A1 | 12/2017 | Choi et al. |
| 2018/0032260 A1 | 2/2018 | Malladi et al. |
| 2018/0190329 A1 | 7/2018 | Kathwala et al. |
| 2018/0203631 A1 | 7/2018 | Doi et al. |
| 2018/0275922 A1 | 9/2018 | Nemazie et al. |
| 2018/0357159 A1 | 12/2018 | Parker et al. |

FOREIGN PATENT DOCUMENTS

| | | |
|---|---|---|
| CN | 107710140 A | 2/2018 |
| JP | 2010-061578 A | 3/2010 |
| JP | 2017-037501 A | 2/2017 |
| JP | 2017-162065 A | 9/2017 |
| JP | 2017-228287 A | 12/2017 |
| TW | 201403318 A | 1/2014 |
| TW | 201633141 A | 9/2016 |
| WO | 2016-117026 A1 | 7/2016 |
| WO | 2016-175028 A1 | 11/2016 |

WORKLOAD-ADAPTIVE OVERPROVISIONING IN SOLID STATE STORAGE DRIVE ARRAYS

CROSS-REFERENCE TO RELATED APPLICATIONS

This application is a continuation of U.S. application Ser. No. 15/915,716 filed on Mar. 8, 2018, the entire contents of which are incorporated herein by reference.

FIELD OF THE INVENTION

The invention relates generally to solid state storage drives and more specifically to workload-adaptive overprovisioning in solid state storage drive arrays.

BACKGROUND OF THE INVENTION

Solid state storage drives (SSDs) commonly present a logical address space that is less than the total available physical memory capacity. Such overprovisioning ("OP") of storage capacity is done primarily for two reasons: First, it ensures that sufficient physical memory resources are available to store invalid data that has not yet been reclaimed through garbage collection. Second, since physical flash cells can tolerate only a finite number of program/erase cycles, distributing programs (writes) over additional physical media allows the write endurance specified for the drive to exceed that of the underlying media. In addition to these primary functions, the overprovisioned physical memory capacity can be used to store metadata and error correction coding data, and to allow the drive to retain full logical capacity in the event of memory failures (bad blocks and/or dies). The amount of overprovisioning in a given SSD may vary depending on the SSD's application, from a single digit percentage for consumer applications (e.g., 64 GB for 1 TB SSD) to a significantly higher percentage, for example 25% or more, for enterprise applications (e.g., 224 GB for 1 TB SSD).

SSDs are rated for a specific number of writes of the drive's logical capacity. This "write endurance" is often expressed as a service life (time) multiplied by a write intensity (write data volume over time). Write intensity is typically specified in terms of "drive writes per day" (N-DWPD), which is how many times the entire logical capacity of the SSD can be overwritten per day of its usable life without failure. The number of available write endurance ratings within a particular product line may be limited. For example, a given product line may offer SSDs rated at 1-, 3-, or 5-DWPD or 1-, 3-, or 10-DWPD for a service life of 5 years.

The amount of OP in an SSD is exponentially related to its rated write endurance, so an SSD rated at 10-DWPD will have a significantly higher percentage of OP than an SSD rated at 1-DWPD. Further, the percentage of OP implemented in an SSD typically assumes the worst case usage of the drive (highest number of writes, highest temperature operation, etc.) during its service life.

The number of data writes from a host and write amplification affect the rate of wear experienced by an SSD. Write amplification is the factor by which the actual amount of data that must be written to the physical media exceeds the amount of logical data received from a host. NAND flash memory cells may not be overwritten, but must first be erased before accepting new data. Write amplification arises because in NAND flash memory the minimum unit of data that can be erased is much larger than the minimum size that can be written. So, when a host overwrites data at a specific logical address, the SSD stores the new data at a new physical address and marks the data previously corresponding to that logical address as stale or "invalid." Erasures are performed in units called blocks. When selecting a block to be erased in preparation to receive new host data, any invalid data may be ignored but valid data in that block must be consolidated and moved elsewhere. Writes associated with this data movement are the underlying mechanism responsible for write amplification. Write amplification is typically expressed as the ratio of the number of bytes written to the physical memory locations of an SSD to the number of bytes written to logical memory locations in the SSD (i.e., number of host writes). Generally, random writes of small blocks of data produces greater write amplification than sequential writes of large blocks of data, and the fuller an SSD's logical capacity the higher its write amplification. Consequently, the write amplification factor is very difficult to estimate because it depends on future use of the SSD.

Customers looking to purchase SSDs have to estimate what their write traffic will be but accurately estimating write traffic is often difficult, particularly for purchasers of SSDs and SSD-based network appliances for use in a datacenter that will provide data storage for a large number and variety of end user applications whose traffic patterns can be unpredictable. Customers typically choose conservatively and thus often may purchase SSDs with a higher DWPD rating and thus more OP than is actually necessary. Thus, there is a need for optimal overprovisioning of SSDs based on the actual workload experienced by the SSDs.

BRIEF DESCRIPTION OF THE INVENTION

In one embodiment, a method for managing overprovisioning in a solid state storage drive array comprises receiving usage data from each of a plurality of solid state storage drives, determining a predicted service life value for each of the plurality of solid state storage drives based on at least the usage data, comparing each of the predicted service life values with a predetermined service life value for each respective solid state storage drive, and dynamically adjusting an available logical storage capacity for at least one of the plurality of solid state storage drives based on a result of the step of comparing. In one embodiment, dynamically adjusting the available logical storage capacity for the at least one of the plurality of solid state storage drives comprises increasing the available logical capacity of that solid state storage drive based on the result that the predicted service life value for that solid state storage drive is greater than the predetermined service life value for that solid state storage drive. In one embodiment, the method further comprises reallocating at least one namespace in the at least one of the plurality of solid state storage drives among the plurality of solid state storage drives based on the result that the predicted service life value for at least one of the plurality of solid state storage drives is not greater than the predetermined service life value for that solid state storage drive. In one embodiment, the method further comprises reducing an available logical storage capacity for at least one of the plurality of solid state storage drives based on the result that the predicted service life value for the at least one of the plurality of solid state storage drives is not greater than the predetermined service life value for that solid state storage drive.

In one embodiment, the step of determining the predicted service life value for each of the plurality of solid state storage drives comprises determining a predicted raw bit error ratio distribution for that solid state storage drive over a series of increasing values of a time index until the predicted raw bit error ratio distribution exceeds a threshold indicating unacceptable performance, and defining the predicted service life value for that solid state storage drive as the current age of that sold state storage drive plus a current value of the time index when the predicted raw bit error ratio exceeds the threshold. In one embodiment, determining the predicted raw bit error ratio distribution is based on a current raw bit error ratio distribution and a number of program/erase cycles predicted to have occurred at a predetermined future time in that solid state storage drive.

In one embodiment, a system for managing overprovisioning in a solid state drive array comprises a plurality of solid state storage drives, each solid state storage drive configured to record usage data, a drive state monitor communicatively coupled to each of the plurality of solid state storage drives, the drive state monitor configured to request the usage data from each of the plurality of stolid state storage drives, a telemetry database configured to store a series values of the usage data received over a period of time from the drive state monitor, an analytics engine communicatively coupled to the telemetry database, the analytics engine configured to determine a predicted service life value of each of the plurality of solid state storage drives based on at least the usage data, and a virtualizer communicatively coupled to the analytics engine, the virtualizer configured to dynamically adjust an available logical storage capacity for at least one of the plurality of solid state storage drives based on a result of a comparison of the predicted service life value for that solid state storage drive to a predetermined service life value for that solid state storage drive. In one embodiment, the virtualizer is configured to increase the available logical storage capacity for the at least one of the plurality of solid state storage drives based on the result that the predicted service life value for that solid state storage drive is greater than the predetermined service life value for that solid state storage drive. In one embodiment, the virtualizer is further configured to reallocate at least one namespace in the at least one of the plurality of solid state storage drives among the plurality of solid state storage drives based on the result that the predicted service life value for that solid state storage drive is not greater than the predetermined service life value for that solid state storage drive. In one embodiment, the virtualizer is further configured to reduce an available logical storage capacity for at least one of the plurality of solid state storage drives based on the result that the predicted service life value for that solid state storage drive is not greater than the predetermined service life value for that solid state storage drive.

In one embodiment, the analytics engine is configured to determine the predicted service life value for each of the plurality of solid state storage drives by determining a predicted raw bit error ratio distribution for that solid state storage drive over a series of increasing values of a time index until the predicted raw bit error ratio distribution exceeds a threshold indicating unacceptable performance, and defining the predicted service life value for that solid state storage drive as the current age of that sold state storage drive plus a current value of the time index when the predicted raw bit error ration exceeds the threshold. In one embodiment, the analytics engine is configured to determine the predicted raw bit error ratio distribution based on a current raw bit error ratio distribution and a number of program/erase cycles predicted to have occurred at a predetermined future time in that solid state storage drive.

DETAILED DESCRIPTION OF THE INVENTION

Figure 1A:
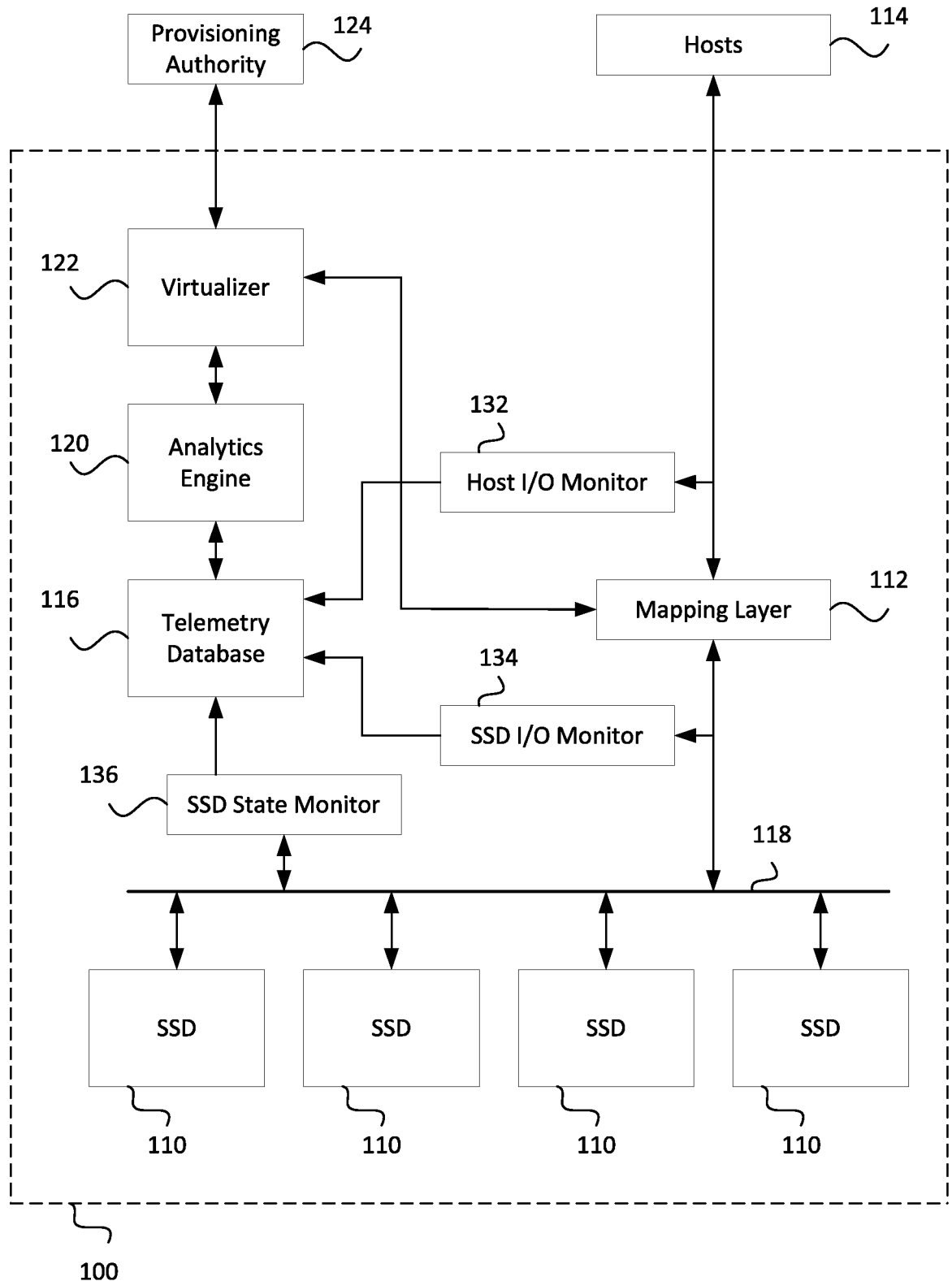
FIG. 1A is a diagram of one embodiment of a network appliance including a solid state storage drive array, according to the invention.

FIG. 1A is a diagram of one embodiment of a network appliance 100 including a solid state storage drive array, according to the invention. Network appliance 100 includes, but is not limited to, a plurality of solid state storage drives (SSDs) 110, a mapping layer 112, a telemetry database 116, an analytics engine 120, and a virtualizer 122. A bus 118 provides a suitable communication path between SSDs 110, mapping layer 112, an SSD I/O monitor 134, and an SSD state monitor 136. Non-Volatile Memory Express (NVMe) is one example of a suitable bus interface protocol for communication over bus 118. While FIG. 1A illustrates four SSDs 110, the specific number of SSDs is not so limited. Network appliance 100 may include one or more SSDs 110 within the scope of the invention.

Mapping layer 112 provides an interface between one or more hosts 114 and the array of SSDs 110 by receiving and responding to read and write commands from hosts 114. NVMe over Fabrics, iSCSI, Fibre Channel, NVMe over Peripheral Component Interconnect Express (PCIe), Serial ATA (SATA), and Serial Attached SCSI (SAS) are suitable bus interface protocols for communication between network appliance 100 and hosts 114. Mapping layer 112 presents each host 114 with a virtualized address space (a "namespace" or "volume") to which that host's I/O commands may be addressed independently of other virtualized address spaces. Mapping layer 112 implements a virtualized address space by mapping (translating) the addresses in the virtualized address space to addresses in a logical address space presented by one or more of SSDs 110. In one embodiment, mapping layer 112 is a program in firmware executed by a controller or processor (not shown) of network appliance 100. Virtualizer 122 manages the mapping of virtualized address spaces by mapping layer 112 in response to requests from a provisioning authority 124 (e.g., an administrator or user interface) to create and delete namespaces, expose those namespaces to hosts 114, etc. A namespace may be mapped entirely to physical memory locations in one SSD 110 or may be mapped to physical memory locations in two or more SSDs 110. Mapping layer 112 and virtualizer 122 together provide a layer of abstraction between hosts 114 and the array of SSDs 110 such that hosts 114 are not aware of how namespaces are mapped to the array of SSDs 110. Virtualizer 122 controls overprovisioning in SSDs 110 by managing the mapped namespaces such that any fraction of the logical capacity of each SSD 110 is exposed as capacity to hosts 114. In one embodiment, virtualizer 122 is a program in firmware executed by a controller or processor of network appliance 100.

Analytics engine 120 uses the data in telemetry database 116 for each SSD 110 in the array to determine an estimate of the remaining service life of each SSD 110. In one embodiment, analytics engine 120 is a program executed by a controller or processor of network appliance 100. The functionality of analytics engine 120 and virtualizer 122 is described further below in conjunction with FIGS. 4 and 5.

SSD state monitor 136 periodically polls each of the SSDs 110 to retrieve information logged internally, including but not limited to host and media traffic statistics, wear state, fraction of physical capacity that has been utilized, and error correction statistics. SSD state monitor 136 may optionally filter or otherwise preprocess this internal state information of SSD 110 before providing the internal state information to telemetry database 116. SSD state monitor 136 associates an identifier with each SSD 110, and relays the identifier and its associated internal state data to telemetry database 116, either actively or in response to being polled. SSD state monitor 136 may poll each SSD 110 at any suitable interval, for example once an hour or once a day. A user or administrator of network appliance 100 configures how often SSD state monitor 136 polls the array of SSDs 110. Each SSD 110 reports its current log data to SSD state monitor 136 in response to the poll.

A host I/O monitor 132 records relevant details of the I/O traffic between hosts 114 and network appliance 100, including but not limited to the capacity of each namespace allocated to each host, the rate of I/O traffic to and from each namespace, and the fraction of each namespace's capacity that has been utilized. An SSD I/O monitor 134 records relevant details of the I/O traffic between mapping layer 112 and each of SSDs 110, including but not limited to the rate of I/O traffic and the fraction of each SSD's 110 logical capacity that has been utilized. Each of host I/O monitor 132 and SSD I/O monitor 134 sends its collected data to telemetry database 116 at a suitable interval, for example once an hour or once a day.

Telemetry database 116 stores time-series values (information indexed by time) for the data from host I/O monitor 132, SSD I/O monitor 134, and SSD state monitor 136. This data may include but is not limited to host usage data, media usage data, and wear data, as explained further below. For example, telemetry database 116 will store as host usage data a series of numbers of bytes of host data written to a namespace reported by host I/O monitor 132 at a series of times. Thus telemetry database 116 stores historical records of a variety of usage and wear data for SSDs 110. The host usage data, media usage data, and wear data stored in telemetry database 116 are discussed further below in conjunction with FIG. 3. Analytics engine 120 analyzes the historical time-series data in telemetry database 116 to estimate future wear and a remaining service life of each SSD 110. Based on the estimated remaining service life of each SSD 110, virtualizer 122 may remap namespaces among SSDs 110, advise an administrator of network appliance 100 that additional OP is needed, or dynamically adjust the amount of OP in one or more of SSDs 110 by exposing more or less of the logical capacity.

Figure 1B:
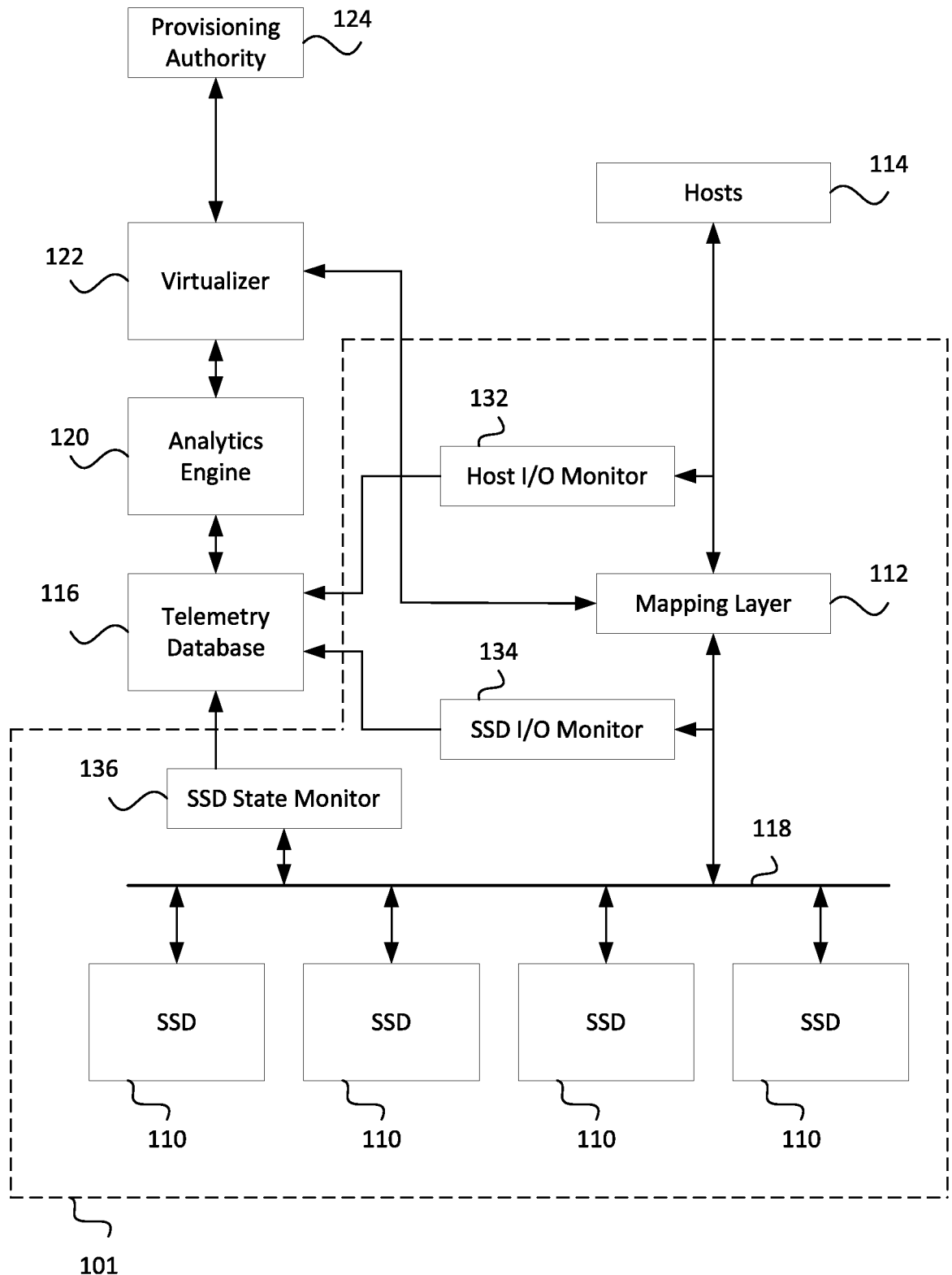
FIG. 1B is a diagram of one embodiment of a network appliance including a solid state storage drive array, according to the invention.

FIG. 1B is a diagram of one embodiment of a network appliance including a solid state storage drive array, according to the invention. In the FIG. 1B embodiment, a network appliance 101 includes but is not limited to SSDs 110, mapping layer 112, host I/O monitor 132, SSD I/O monitor 134, and SSD state monitor 136. Telemetry database 116, analytics engine 120, and virtualizer 122 are located outside of network appliance 101 and may store and process telemetry data for SSDs in one or more network appliances in addition to network appliance 101.

Figure 2:
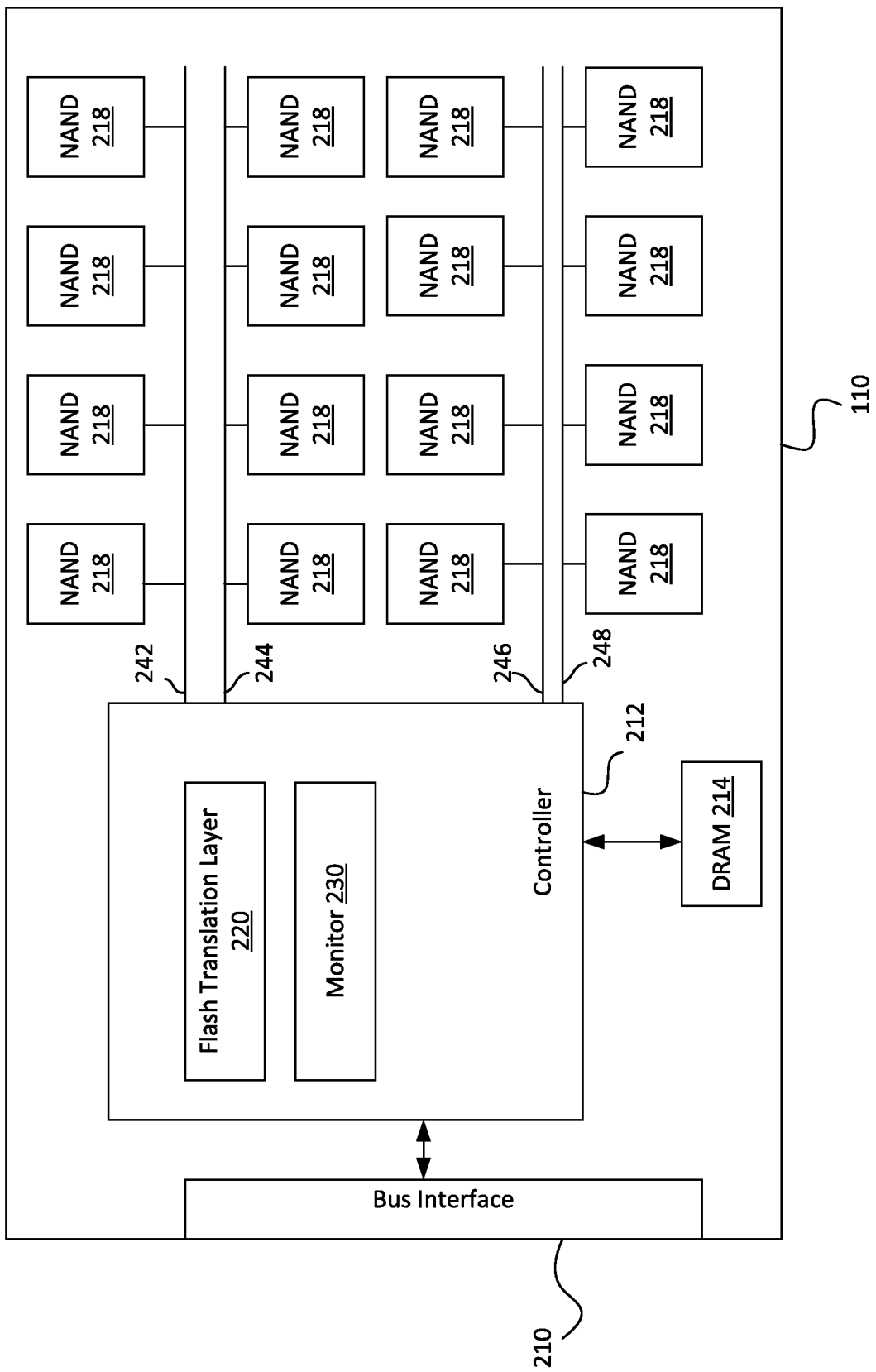
FIG. 2 is a diagram of one embodiment of a solid state storage drive of the network appliance of FIG. 1A, according to the invention.

FIG. 2 is a diagram of one embodiment of a solid state storage drive (SSD) 110 of the network appliance 100 of FIG. 1A, according to the invention. SSD 110 includes a bus interface 210 that allows SSD 110 to be communicatively coupled to bus 118 for communication with other devices. SSD 110 includes a controller 212 in communication with an external DRAM 214 and an array of NAND devices 218. Controller 212 manages the writing (programming), reading, and erasing of data stored on NAND devices 218. Controller 212 includes, but is not limited to, a flash translation layer (FTL) 220 in firmware to map the logical addresses of data from host 114 to physical pages and blocks of NAND devices 218. Controller 212 implements a monitoring function 230. Controller 212 may use DRAM 214 as a buffer for temporarily storing host data (caching) and for temporarily storing address mapping metadata, and for other purposes.

NAND devices 218 are arranged in four channels 242, 244, 246, 248 in communication with controller 212. While sixteen NAND devices 218 arranged in four channels are shown in SSD 110 in FIG. 2, the specific number of NAND devices and channels is not limited as such, and SSD 110 may include one or more NAND devices 218 arranged in one or more channels within the scope of the invention. In one embodiment, NAND devices 218 are SLC NAND devices, MLC NAND devices, TLC NAND devices, QLC NAND devices, or a combination thereof.

Monitor 230 records operational statistics and media wear information for SSD 110. The recorded log data may include, but is not limited to, host usage data, media usage data, and wear data. Host usage data includes, but is not limited to, the number of bytes of data writes from the host. Media usage data includes, but is not limited to, the number of bytes of data written to NAND devices 218 (including writes associated with garbage collection and refresh operations, where a refresh operation is a refresh cycle that involves reading data from pages, performing any error correction, and writing the pages of data to new page locations), the number of program/erase cycles that have been performed, and the number of refresh cycles performed. Wear data includes, but is not limited to, the raw bit error ratio (the number of bit errors before correction divided by the total number of bits read), and the number of blocks marked as unusable ("bad blocks"). Monitor 230 stores the recorded log data in any appropriate memory location, including but not limited to a memory internal to controller 212, DRAM 214, or NAND devices 218. In response to a request from SSD state monitor 136, controller 212 reports current log data to SSD state monitor 136.

Figure 3:
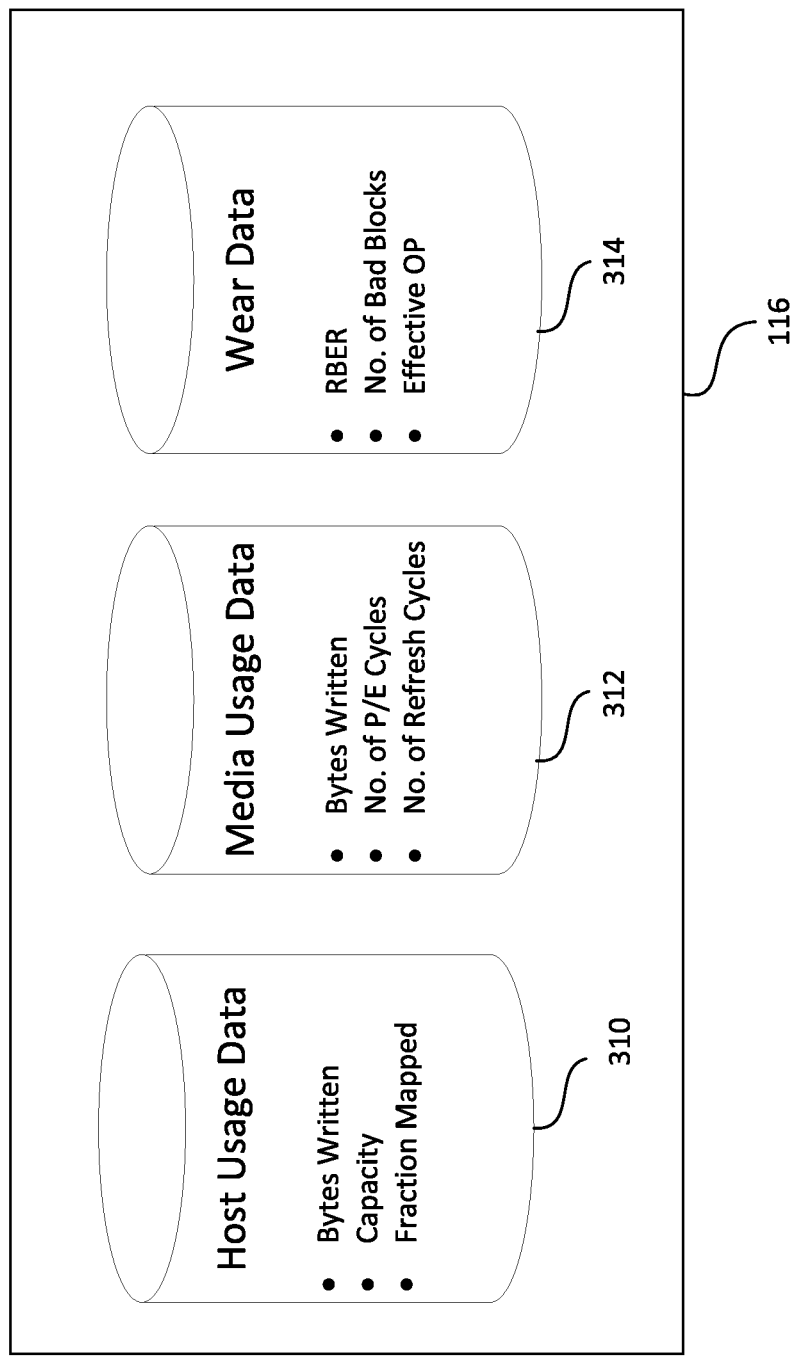
FIG. 3 is a diagram of one embodiment of a solid state storage drive array telemetry database, according to the invention.

FIG. 3 is a diagram of one embodiment of a solid state storage drive array telemetry database 116, according to the invention. A host usage area 310 stores host usage data for each namespace mapped to one or more SSDs 110. The host usage data may include, but is not limited to, the number of bytes of data from the host written to the namespace, the total logical capacity of the namespace, and the fraction of the capacity of the namespace that has been programmed (i.e., contains data from the host). A media usage area 312 stores media usage data for each of SSDs 110. The media usage data may include, but is not limited to, the number of total bytes written to each SSD 110 including writes related to garbage collection and refresh operations, the number of program/erase cycles, and the number of refresh cycles performed. A wear data area 314 stores wear-related data that may include, but is not limited to, a raw bit error ratio (RBER) distribution, a number of bad blocks, and an effective OP. The RBER distribution is a distribution over the physical media in each SSD 110 of the number of bit errors (before error correction) divided by the number of total read bits expressed as a percentage. The RBER distribution is an indicator of the wear state of the physical memory, as NAND memory becomes more prone to bit errors as wear increases. In one embodiment, the raw bit error ratio distribution is a histogram of raw bit error ratios for all the pages (or another unit smaller than a block) of flash memory in an SSD 110. The number of bad blocks represents the number of memory blocks that have been marked as "bad" or unusable by the firmware of the SSD. The effective OP is the number of bytes of physical memory that is "spare area" plus the number of bytes of the logical capacity of the SSD that are unused, divided by the total number of bytes of logical capacity of the SSD. This value is the effective OP because the SSD can use logical capacity that is not assigned to host data as "spare area" in addition to the memory designated as OP.

Each entry in telemetry database 116 is associated with a timestamp and an identifier of the namespace or SSD 110 that reported the data. In one embodiment, telemetry database 116 stores the time-series data over the rated lifetime of SSDs 110, typically 5 years, or indefinitely. The time-series data stored in telemetry database 116 represents a historical record of the actual workload of each of SSDs 110 and of the resulting rate of media wear. Analytics engine 120 and virtualizer 122 use this actual workload data for each SSD 110 to manage the mapping of namespaces among the array of SSDs 110 and the amount of overprovisioning of each SSD 110.

Figure 4:
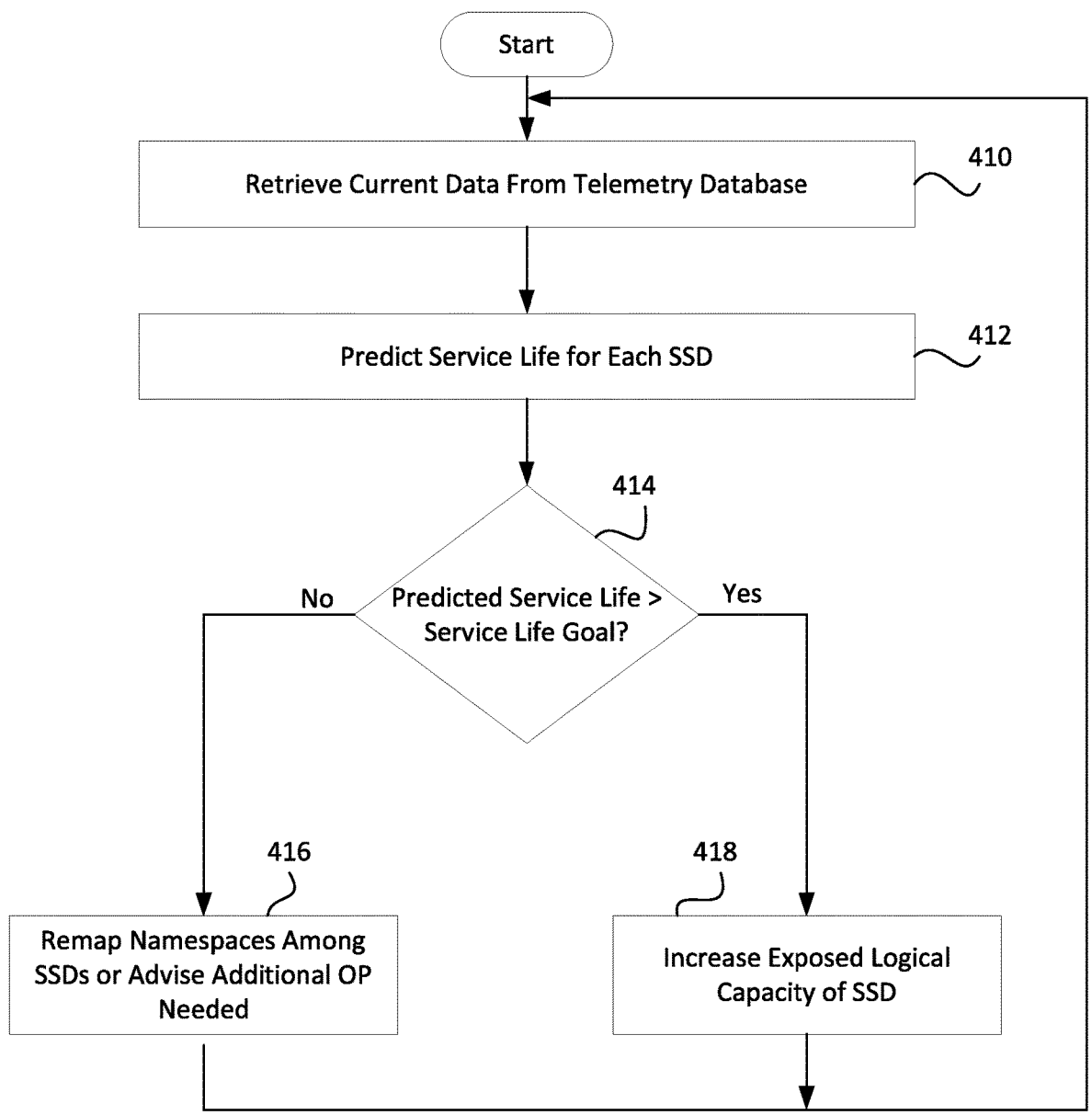
FIG. 4 is a flowchart of method steps for workload-adaptive overprovisioning in a solid state storage drive array, according to one embodiment of the invention.

FIG. 4 is a flowchart of method steps for workload-adaptive overprovisioning in a solid state storage drive array, according to one embodiment of the invention. In a step 410, analytics engine 120 retrieves current data from telemetry database 116, which stores the telemetry data for each namespace and each SSD 110 along with a timestamp for each data entry. In a step 412, analytics engine 120 predicts a service life for each SSD 110 based on the actual historical workload of the SSD as represented by the telemetry data in telemetry database 116. One embodiment of a technique for determining the predicted service life for an SSD 110 is described below in conjunction with FIG. 5.

In a step 414, analytics engine 120 compares the predicted service life for the SSD 110 with the service life goal for that SSD, for example the rated service life of 5 years. If the predicted service life of the SSD is greater than the predetermined service life goal, then in a step 418 virtualizer 122 increases the exposed logical capacity of the SSD, which decreases the OP, thus allowing the user or administrator of the SSD to capture more value from the SSD. If the predicted service life of the SSD is not greater than the service life goal, then in a step 416 virtualizer 122 remaps one or more namespaces among the SSDs 110 in network appliance 100 so that the namespaces mapped to that particular SSD have a lower overall usage and wear rate, or advises an administrator of network appliance 100 that additional OP is required to meet the service life goal. In another embodiment, if the predicted service life of the SSD is not greater than the service life goal, virtualizer 122 reduces the exposed logical capacity of the SSD, which increases the OP.

In one embodiment, telemetry database 116 is updated at a frequency of about once an hour or about once day and analytics engine 120 generates a predicted service life for SSDs 110 at a frequency of about once a week or about every two weeks. By using the historical telemetry data in telemetry database 116 that represents the actual workload and wear for the memory mapped to namespaces in an SSD 110, analytics engine 120 is able to generate a predicted service life that more accurately represents the drive's service life than an extrapolation from the SSD's conventional wear indicator.

Figure 5:
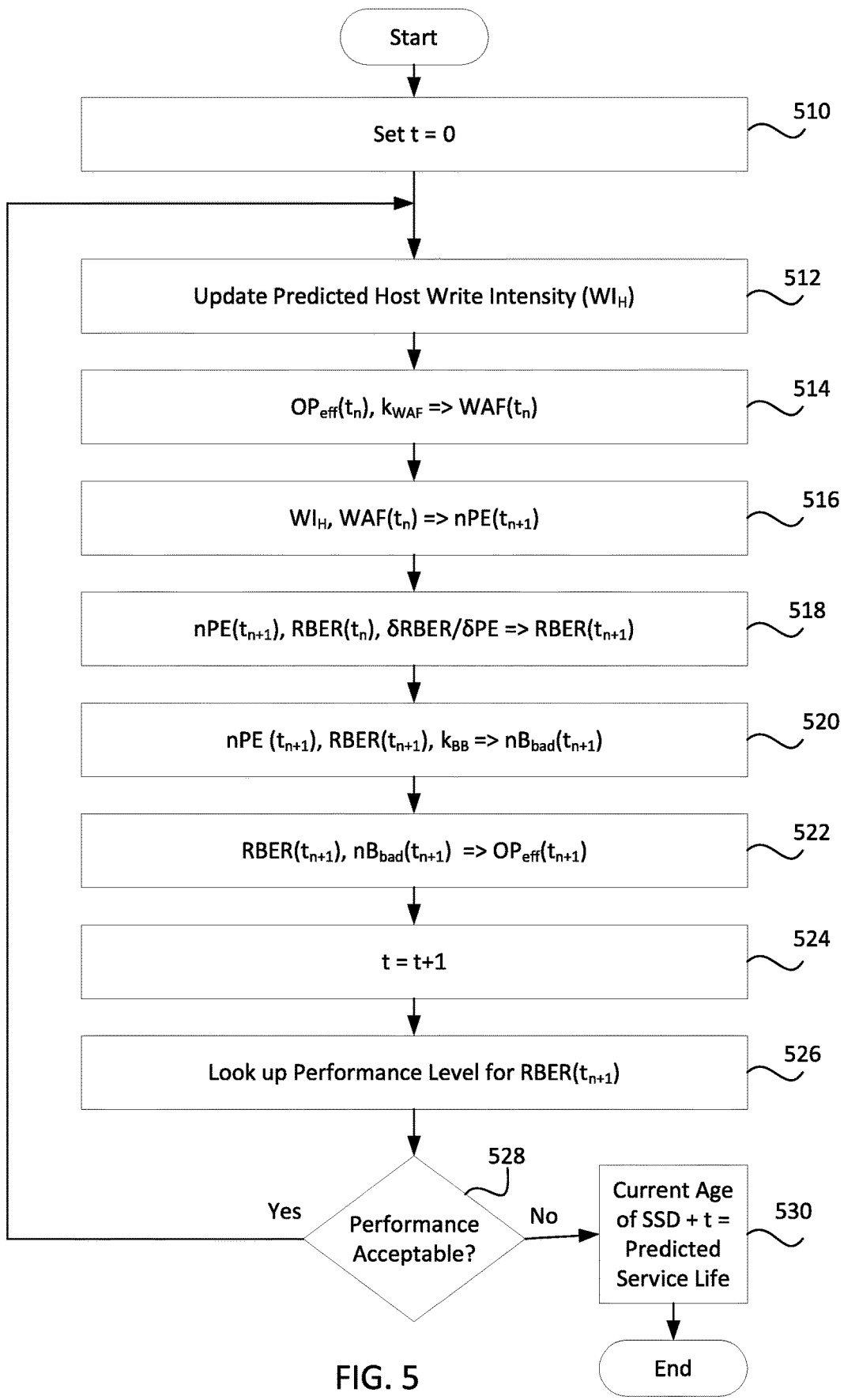
FIG. 5 is a flowchart of method steps for determining a predicted service life of a solid state storage drive, according to one embodiment of the invention.

FIG. 5 is a flowchart of method steps for determining a predicted service life of a solid state storage drive, according to one embodiment of the invention. In a step 510, analytics engine 120 sets a time index "t" equal to zero. The time index represents a number of units of time. In one embodiment, the unit of time is an hour and thus the value of the time index represents a number of hours. In a step 512, analytics engine 120 updates a predicted host write intensity variable ($WI_H$). The predicted host write intensity is a variable whose value represents an estimated rate of writes received by the SSD 110 from each host or some aggregate of them, expressed as a number of bytes over time. Analytics engine 120 calculates the predicted host write intensity by analyzing historical host write rates from the host write data stored in telemetry database 116. This calculation may be done on a per-namespace or a per-host basis, or on a coarser aggregate of namespaces or hosts. In one embodiment, analytics engine 120 identifies local maxima in host write activity over time, and weights their value based on how far back in time that maximum value occurred. For example, if the maximum host write rate occurred a significant period of time in the past (e.g., two years ago) the value is weighted less than if the maximum host write rate occurred recently (e.g., six hours ago). In a step 514, analytics engine 120 determines a write amplification factor ($WAF(t_n)$) based on the effective OP ($OP_{eff}$) and a write amplification factor constant ($k_{WAF}$). In one embodiment, the write amplification factor is modeled based on a theoretical "worst-case" write amplification factor that would result from a uniformly distributed random write pattern to the namespace with the given effective OP, modified by the write amplification factor constant. The write amplification factor constant is a scalar value that is empirically determined based on the ratio of the historical media writes and host writes. In one embodiment, the write amplification factor constant has a value between 0 and 1, inclusive.

In a step 516, analytics engine 120 determines a predicted number of program/erase cycles ($nPE(t_{n+1})$) based on the predicted host write intensity and the write amplification factor. The predicted number of program/erase cycles is a value that represents a prediction of the number of program/erase cycles that will have occurred a predetermined time in the future, for example one hour from the current time. In one embodiment, the product of the predicted host write intensity and the write amplification factor is a predicted write media intensity for the SSD 110. Analytics engine 120 multiplies the predicted write media intensity by a constant derived from the physical characteristics of the flash media to generate the predicted number of program/erase cycles. The value of the constant depends on the size of the flash page in bytes and the number of pages in a block, as for every page_bytes*pages_per_block (number of page bytes multiplied by number of pages per block) bytes programmed, a block erase must be performed. In a step 518, analytics engine 120 determines a predicted raw bit error ratio distribution over the flash memory in the SSD 110 based on the predicted number of program/erase cycles, a current raw bit error ratio distribution, and an observed rate of change of the raw bit error ratio by a rate of change of the program/erase cycles. In one embodiment, the raw bit error ratio distribution is a histogram of raw bit error ratios for all the pages (or another unit smaller than a block) of flash memory in the SSD 110. In this embodiment, analytics engine 120 predicts how the shape of this histogram will change over time because the "tail" of the histogram indicates the amount of flash memory for which the raw bit error ratio has reached an uncorrectable value. By tracking the raw bit error ratio distribution across the flash memory of SSD 110 instead of assuming that the raw bit error ratio is constant for all flash memory in SSD 110, analytics engine 120 is able to provide a predicted service life for the SSD 110 that is more accurate than an extrapolation from a conventional SSD wear indicator.

In a step 520, analytics engine 120 determines a predicted number of bad blocks ($nB_{bad}(t_{n+1})$) based on the predicted number of program/erase cycles, the predicted raw bit error ratio distribution, and a bad block empirical constant ($k_{BB}$). In a step 522, analytics engine 120 determines a predicted effective OP based on the predicted raw bit error ratio distribution and the predicted number of bad blocks. In one embodiment, analytics engine 120 determines an amount of physical capacity consumed by the predicted number of bad blocks and by additional error correction needed to address the predicted raw bit error ratio distribution, and deduct that physical capacity from the current effective OP. In a step 524, analytics engine 120 increases the time index by 1. For example, when the time index reflects a number of hours, the time index is increased by 1 hour.

In a step 526, analytics engine 120 looks up or calculates a performance level associated with the predicted raw bit error ratio distribution, where the raw bit error ratio is typically inversely related to performance. An increase in the raw bit error ratio will cause an increase in error correction activity in an SSD, which may lead to use of enhanced error correction strategies capable of handling greater numbers of errors, including using read retries of the flash memory and more compute-intensive error correction coding schemes such as LDPC (Low Density Parity Code) and QSBC (Quadruple Swing-By Code). The enhanced strategies generally introduce greater latencies, particularly during decoding, which results in increased read latencies and lower data throughput. The performance level for a given raw bit error ratio may be determined empirically, for example by collecting measurement data on SSDs subject to a variety of workloads over the expected lifetime of the SSD (which may be simulated by accelerated aging such as using high temperatures) or calculated based on known latencies of the error correction schemes in use. In one embodiment, analytics engine 120 uses a look up table to identify a performance level associated with the predicted raw bit error ratio distribution. In a step 528, analytics engine 120 determines whether the performance level associated with the predicted raw bit error ratio distribution is acceptable. In one embodiment, analytics engine 120 determines whether the performance level exceeds a predetermined threshold. If the predicted performance level is acceptable, then the method returns to step 512. If the predicted performance level is not acceptable, that is, if the performance level indicates that the SSD no longer meets is warranted performance, then in a step 530 the current age of the SSD added to the value of t is defined as the predicted service life of the SSD.

As set forth above, the method of FIG. 5 generates, over time intervals such as 1 hour, a series of predicted values for attributes that reflect the performance of the SSD that are based on the actual usage and wear experienced by the SSD. When the predicted performance level of the SSD becomes unacceptable, the time associated with that prediction provides the predicted service life of the SSD. The predicted service life allows for the amount of overprovisioning of an SSD to be dynamically adjusted over time to in turn maximize the value realized from the purchase of the SSD.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A method for managing overprovisioning in a solid state storage drive array comprising:
   receiving usage data from each of a plurality of solid state storage drives;
   determining a predicted service life value for each of the plurality of solid state storage drives based on at least the usage data;
   comparing each of the predicted service life values with a predetermined service life value for each respective solid state storage drive; and
   remapping at least one namespace in at least one of the plurality of solid state storage drives among the plurality of solid state storage drives, or reducing an available logical storage capacity for at least one of the plurality of solid state storage drives, wherein the remapping or reducing is based on a result of the comparing that the predicted service life value for the at least one of the plurality of solid state storage drives is not greater than the predetermined service life value for that solid state storage drive.

2. The method of claim 1, further comprising:
   advising an administrator of the solid state storage drive array that additional resources are required to meet a service life goal.

3. The method of claim 1, further comprising:
   reducing an available logical storage capacity for at least one of the plurality of solid state storage drives based on the result that the predicted service life value for that solid state storage drive is not greater than the predetermined service life value for that solid state storage drive.

4. The method of claim 1, wherein the usage data comprises host usage data and media usage data.

5. The method of claim 4, wherein the host usage data comprises a number of bytes of data written from a host and the media usage data includes a number of bytes of data written to physical memory.

6. The method of claim 1, further comprising receiving wear data from the plurality of solid state storage drives, and wherein determining the predicted service life value for each of the plurality of solid state storage drives is based on the usage data and the wear data.

7. The method of claim 1, wherein determining the predicted service life value for each of the plurality of solid state storage drives comprises:
    determining a predicted raw bit error ratio distribution for that solid state storage drive over a series of increasing values of a time index until the predicted raw bit error ratio distribution exceeds a threshold indicating unacceptable performance; and
    defining the predicted service life value for that solid state storage drive as the current age of that sold state storage drive plus a current value of the time index when the predicted raw bit error ratio exceeds the threshold.

8. The method of claim 7, wherein determining the predicted raw bit error ratio distribution is based on a current raw bit error ratio distribution and a number of program/erase cycles predicted to have occurred at a predetermined future time in that solid state storage drive.

9. The method of claim 8, wherein the number of program/erase cycles predicted to have occurred at the predetermined future time is based on a predicted write amplification factor for that solid state storage drive.

10. The method of claim 9, wherein the predicted write amplification factor is based on an effective overprovisioning value for that solid state storage drive.

11. A system for managing overprovisioning in a solid state storage drive array comprising:
    a plurality of solid state storage drives, each solid state storage drive configured to record usage data;
    a drive state monitor communicatively coupled to each of the plurality of solid state storage drives, the drive state monitor configured to request usage data from each of the plurality of stolid state storage drives;
    a telemetry database configured to store a series of values of the usage data received over a period of time from the drive state monitor;
    an analytics engine communicatively coupled to the telemetry database, the analytics engine configured to determine a predicted service life value of each of the plurality of solid state storage drives based on at least the usage data; and
    a virtualizer communicatively coupled to the analytics engine, the virtualizer configured to remap at least one namespace in at least one of the plurality of solid state storage drives among the plurality of solid state storage drives, or reduce an available logical storage capacity for at least one of the plurality of solid state storage drives, wherein the remapping or reducing is based on a result of the comparing that the predicted service life value for that solid state storage drive to a predetermined service life value for that solid state storage drive.

12. The system of claim 11, wherein the virtualizer is further configured to reduce an available logical storage capacity for at least one of the plurality of solid state storage drives based on the result that the predicted service life value for that solid state storage drive is not greater than the predetermined service life value for that solid state storage drive.

13. The system of claim 11, wherein the usage data comprises host usage data and media usage data.

14. The system of claim 13, wherein the host usage data comprises a number of bytes of data written from a host and the media usage data includes a number of bytes of data written to physical memory.

15. The system of claim 11, wherein the drive state monitor is further configured to request wear data from the plurality of solid state storage drives, and wherein the analytics engine is configured to determine the predicted service life value for each of the plurality of solid state storage drives based on the usage data and the wear data.

16. The system of claim 11, wherein the analytics engine is configured to determine the predicted service life value for each of the plurality of solid state storage drives by determining a predicted raw bit error ratio distribution for that solid state storage drive over a series of increasing values of a time index until the predicted raw bit error ratio distribution exceeds a threshold indicating unacceptable performance; and
    defining the predicted service life value for that solid state storage drive as the current age of that sold state storage drive plus a current value of the time index when the predicted raw bit error ratio exceeds the threshold.

17. The system of claim 16, wherein the analytics engine is configured to determine the predicted raw bit error ratio distribution based on a current raw bit error ratio distribution and a number of program/erase cycles predicted to have occurred at a predetermined future time in that solid state storage drive.

18. The system of claim 17, wherein the analytics engine is configured to determine the number of program/erase cycles predicted to have occurred at the predetermined future time based on a predicted write amplification factor for that solid state storage drive.

19. The system of claim 18, wherein the analytics engine is configured to determine the predicted write amplification factor based on an effective overprovisioning value for that solid state storage drive.

* * * * *